US012654118B2

(12) United States Patent
Yoon et al.

(10) Patent No.: US 12,654,118 B2
(45) Date of Patent: Jun. 16, 2026

(54) BIODEGRADABLE COMPOSITE FILTER MEDIA FOR AIR FILTERS AND MANUFACTURING METHOD THEREOF

(71) Applicant: NAM YANG NON-WOVEN FABRIC CO., LTD., Ansan-si (KR)

(72) Inventors: Young Hyun Yoon, Anyang-si (KR); Heon Byung Chae, Ansan-si (KR)

(73) Assignee: NAM YANG NON-WOVEN FABRIC CO., LTD., Ansan-si (KR)

( * ) Notice: Subject to any disclaimer, the term of this patent is extended or adjusted under 35 U.S.C. 154(b) by 395 days.

(21) Appl. No.: 18/534,187

(22) Filed: Dec. 8, 2023

(65) Prior Publication Data

US 2024/0216845 A1 Jul. 4, 2024

(30) Foreign Application Priority Data

Dec. 30, 2022 (KR) ........................ 10-2022-0190376

(51) Int. Cl.
*B01D 39/16* (2006.01)

(52) U.S. Cl.
CPC .... *B01D 39/163* (2013.01); *B01D 2239/0233* (2013.01); *B01D 2239/025* (2013.01); *B01D 2239/0266* (2013.01); *B01D 2239/0618* (2013.01); *B01D 2239/0631* (2013.01); *B01D 2239/1225* (2013.01); *B01D 2239/1291* (2013.01)

(58) Field of Classification Search
CPC ............ B01D 39/163; B01D 2239/025; B01D 2239/0266; B01D 2239/0618; B01D 2239/0631; B01D 2239/1225; B01D 2239/1291; B01D 2239/0233; A41D 13/11; A62B 23/025
See application file for complete search history.

(56) References Cited

U.S. PATENT DOCUMENTS

| | | | | |
|---|---|---|---|---|
| 8,172,092 B2 * | 5/2012 | Green | ................ | B01D 39/1623 210/493.1 |
| 2001/0027225 A1 * | 10/2001 | Downie | .............. | C08K 5/0033 523/124 |
| 2008/0314010 A1 * | 12/2008 | Smithies | .............. | B01D 63/067 55/528 |
| 2008/0314011 A1 * | 12/2008 | Smithies | ............ | B01D 39/1623 55/521 |
| 2009/0019825 A1 * | 1/2009 | Skirius | ................ | B01D 46/521 55/524 |
| 2010/0218471 A1 * | 9/2010 | Smithies | ............ | B01D 39/1623 55/486 |
| 2010/0307119 A1 * | 12/2010 | Leung | ................ | B01D 39/1623 55/486 |
| 2020/0139282 A1 * | 5/2020 | Mizogami | .............. | D04H 3/011 |
| 2020/0325599 A1 * | 10/2020 | Mason | ...................... | D01F 6/62 |
| 2021/0061989 A1 * | 3/2021 | Ouyang | .................. | C08K 3/34 |
| 2022/0372666 A1 * | 11/2022 | Schultz | ................. | D04H 1/435 |
| 2025/0034769 A1 * | 1/2025 | Yoon | ..................... | D04H 1/541 |

FOREIGN PATENT DOCUMENTS

KR 101527498 B1 6/2015

* cited by examiner

*Primary Examiner* — Robert Clemente
(74) *Attorney, Agent, or Firm* — Rabin & Berdo, P.C.

(57) ABSTRACT

The present invention relates to a thermally bonded biodegradable filter support and a biodegradable composite filter media for an air filter and a mask using the same. More particularly, the present invention relates to an environmentally-friendly dry nonwoven fabric or thermally bonded biodegradable filter support and a biodegradable composite filter media for air filters, which biodegrade under soil burial conditions when disposed of after reaching the end of their lifespan.

5 Claims, 1 Drawing Sheet

BIODEGRADABLE COMPOSITE FILTER MEDIA FOR AIR FILTERS AND MANUFACTURING METHOD THEREOF

CROSS-REFERENCE TO RELATED APPLICATIONS

This application claims the benefit of Korean Patent Application No. 10-2022-0190376 filed on Dec. 30, 2022 in the Korean Intellectual Property Office, which is incorporated herein by reference in its entirety.

BACKGROUND OF THE INVENTION

1. Field of the Invention

The present invention relates to a biodegradable composite filter media for an air filter, which is manufactured using a thermally bonded biodegradable filter support composed of a dry nonwoven fabric and a method of manufacturing the same. More particularly, the present invention relates to an environmentally-friendly, thermally bonded biodegradable filter support that biodegrades under soil burial conditions when disposed of after use, a biodegradable composite filter media for air filters comprising the same, and a facial mask comprising an air filter into which the composite filter media is incorporated.

2. Description of Related Art

In general, an air filter device is a device designed to filter out fine dust and foreign substances. The air filter device is installed at a passage where air flows in and out to create a dust-free environment so that filtered clean air flows into the interior environment. Along with the development of the industry and the increase of environmental pollution, the demand for such a filter device is continuously increasing.

Generally, an air filter consists of a dust-collecting member that acts as a filter and a filter support that supports the dust-collecting member. In this case, the dust-collecting mainly member uses an electrostatically treated polypropylene melt-blown nonwoven fabric, and the filter support uses a polyester spunbond nonwoven fabric. On the other hand, polypropylene or polyester used in this case is a synthetic fiber that does not decompose when left to stand in the natural world after use, resulting in environmental problems. Thus, the air filter must be buried in the ground or incinerated after use, and the environmental burden caused by air pollution or landfill is emerging as a serious social issue. In addition, in recent years, there has been a demand for reduction of a load on the environment in terms of global environmental conservation and resource circulation. Therefore, there is a need for a material that that biodegrades under soil burial conditions when disposed of after use.

In response to the contemporary demand for load reduction on the environment, there is an increasing need for a filter that biodegrades under soil burial conditions when discarded. Further, a need for an environmentally-friendly biodegradable filter support, which is a crucial part of the filter, is also increasing. Moreover, there have been attempts to replace the conventional polypropylene melt-blown nonwoven fabric used for the dust-collecting member with an environmentally-friendly dust collecting fabric. However, its use remains limited in practice due to cost constraints. Therefore, as an alternative, there is a need to reduce the weight proportion of the dust-collecting member in the filter media, and a need for the development of an alternative filter media material such as an electrospun nanofiber as a substitute for the polypropylene melt-blown nonwoven fabric is also increasing.

Meanwhile, the electrospun nanofiber can be used as a substitute material for air filters or mask filters, which replaces the electrostatic melt-blown nonwoven fabric. Such an electrospun nanofiber has an advantage in that the filtration efficiency does not decrease even in the presence of moisture due to a physical filtration property based on the porosity of nanofibers. Further, the electrospun nanofiber has the advantage of reducing the environmental burden since its use amount is very small to an extent of approximately $1/20$ to $1/100$ in the weight proportion compared to the melt-blown nonwoven fabric. Furthermore, in the case were a biodegradable polymer resin is electrospun onto the filter support, the effect of reducing the environmental burden can further increase.

In this case, the bonding strength between the biodegradable filter support used as a substrate and the electrospun nanofiber is crucial. It is essential that this biodegradable filter support should maintain its physical properties as a filter support during use, and retain its biodegradable characteristics under soil burial conditions when disposed of. Therefore, there is a need for the manufacture of a dry nonwoven fabric or a thermally bonded biodegradable filter support that biodegrades under soil burial conditions when disposed of after use, but there is insufficient research on the dry nonwoven fabric or the biodegradable filter support. Besides, there is limited research on a thermally bonded biodegradable filter support that is combined with the electrospun nanofiber to demonstrate the physical properties necessary for use as a filter media for air filters or mask filters, such as air permeability and the like. Such a biodegradable filter support encounters a challenge to simultaneously satisfy the physical properties and the biodegradability necessary for use as the filter support.

PRIOR ART LITERATURE

Patent Documents

Patent document 1: Korean Patent No. 10-1527498 (issued on 9 Jun. 2015)

SUMMARY OF THE INVENTION

Accordingly, the present invention has been made to solve the aforementioned problems occurring in the prior art, and it is an object of the present invention to provide a composite filter media for an air filter using an environmentally-friendly, dry nonwoven fabric or thermally bonded biodegradable filter support that biodegrades under soil burial conditions when disposed of after use, and a facial mask.

To achieve the above object, the present invention provides a biodegradable composite filter media for an air filter, which comprises: a thermally bonded biodegradable filter support comprising a dry nonwoven fabric composed of single or multiple layers and made of sheath-core type polyester-based biodegradable thermal bonding composite fibers; and an electrospun nanofiber layer comprising a nanofiber having a diameter of 70 to 500 nm, the nanofiber layer being formed by electrospinning a polymer resin onto one or both surfaces of the thermally bonded biodegradable filter support.

In addition, the present invention is directed to a method of manufacturing a biodegradable composite filter media for an air filter. The composite filter media is manufactured by performing a process of including: a first step of producing a dry nonwoven fabric made of sheath-core type polyester-based biodegradable thermal bonding composite fibers; and a second step of forming an electrospun nanofiber layer comprising a nanofiber having a diameter of 70 to 500 nm by electrospinning an electrospinning solution onto one or both surfaces of the dry nonwoven fabric.

Further, the present invention is directed to a facial mask using the composite filter media for an air filter. The composite filter media includes: a biodegradable filter support; and a dust-collecting member disposed on one surface of the biodegradable filter support.

Effects of the Invention

The biodegradable filter support and the composite filter media including the same according to the present invention have advantageous effects in that they retain sufficient physical properties including thickness, air permeability, tensile strength, etc., so as to function as a filter support. In addition, the biodegradable filter support and the composite filter media according to the present invention have advantageous effects in that they biodegrade under soil burial conditions when disposed of after reaching the end of their lifespan, leading to a reduction in the environmental burden.

BRIEF DESCRIPTION OF THE DRAWINGS

The above and other objects, features and advantages of the present invention will be apparent from the following detailed description of the preferred embodiments of the invention when taken in conjunction with the accompanying drawings, in which.

DESCRIPTION OF REFERENCE NUMERALS

Figure 1:
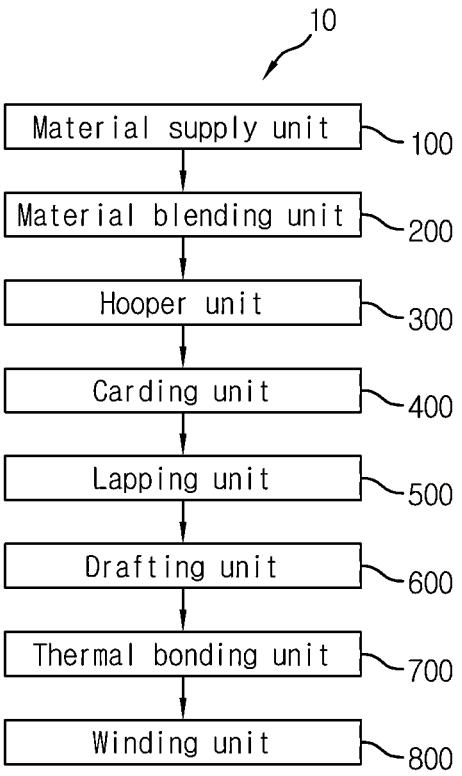
FIG. 1 is a flowchart illustrating a process for manufacturing a thermally bonded biodegradable filter support (or a dry nonwoven fabric) according to an embodiment of the present invention.
Figure 2:
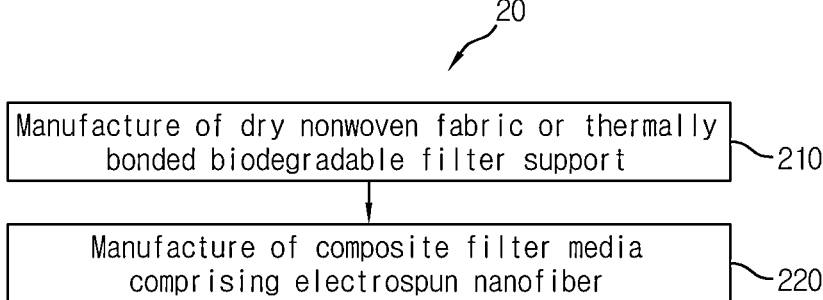
FIG. 2 is a flowchart illustrating a process for manufacturing a biodegradable composite filter media for an air filter according to an embodiment of the present invention.

10: dry nonwoven fabric or thermally bonded biodegradable filter support-manufacturing process
100: material supply unit
200: material blending unit
300: hooper unit
400: carding unit
500: lapping unit
600: drafting unit
700: thermal bonding unit
800: winding unit
20: Process of manufacturing composite filter media for air filters
210: Step of manufacturing dry nonwoven fabric or thermally bonded biodegradable filter support
220: Step of manufacturing composite filter media comprising electrospun nanofiber

DETAILED DESCRIPTION OF THE PREFERRED EMBODIMENTS

Hereinafter, preferred embodiments of the present invention will be described in detail with reference to the accompanying drawings in order to help fully understand the present invention.

Examples of the present invention may be modified in various different forms, and the scope of the present invention should not be construed as being limited to the below-described examples. These examples are provided to completely describe the invention to one having ordinary skill in the art. In the following description of the present invention, a detailed description of related known functions and configurations incorporated herein will be omitted, if necessary, when it may rather make the subject matter of the present invention unclear.

A biodegradable composite filter media for an air filter according to the present invention comprises: a thermally bonded biodegradable filter support comprising a dry nonwoven fabric composed of single or multiple layers and made of sheath-core type polyester-based biodegradable thermal bonding composite fibers; and an electrospun nanofiber layer comprising a nanofiber having a diameter of 70 to 500 nm, the nanofiber layer being formed by electrospinning a polymer resin onto one or both surfaces of the thermally bonded biodegradable filter support.

First, the thermally bonded biodegradable filter support will be described hereinafter.

A process of manufacturing the dry nonwoven fabric forming the thermally bonded biodegradable filter support of the present invention will be described below with reference to FIG. 1.

As shown in FIG. 1, a yarn is supplied from a material supply unit 100 to a material blending unit 200, which in turn blends each yarn gathered together therein with each other. Then, the yarn blended and clumped together in the material blending unit 200 is separated in a hooper unit 300. The yarn separated in the hooper unit 300 is formed in the form of a thin film having a uniform thickness in a carding unit 400. Thereafter, a single-layered nonwoven fabric is supplied from the carding unit 400 to a lapping unit 500, which in turn laminates the single-layered nonwoven fabric into multiple layers while laterally moving the single nonwoven fabric layer to thereby form a nonwoven fabric layer with a specific thickness. Then, the nonwoven fabric layer is supplied from the lapping unit 500 to a drafting unit 600 and is stretched. Then, the stretched nonwoven fabric layer is fed from the drafting unit 600 to a thermal bonding unit 700, and then is bonded by heat and pressure in the thermal-bonding unit 700. Subsequently, the nonwoven fabric layer bonded in the thermal bonding unit 700 is fed to and wound up in a winding unit 800 to thereby manufacture a dry nonwoven fabric.

In addition, the configuration and function of the material supply unit 100, the material blending unit 200, the hooper unit 300, the carding unit 400, the lapping unit 500, the thermal bonding unit 700, and the winding unit 800, which are constituent elements included for the process 10 of manufacturing the dry nonwoven fabric applied as the thermally bonded biodegradable filter support according to the present invention and the thermally bonded biodegradable filter support, may be adopted or appropriately modified in the manufacturing process of the nonwoven fabric, particularly the carding process, and thus a detailed description thereof will be omitted to avoid redundancy.

As such, the use of the nonwoven fabric produced by the carding process enables the creation of a web by spreading a staple fiber as a material thinly, and allows for the manufacture of the dry nonwoven fabric or the thermally bonded biodegradable filter support by bonding each staple fiber through a physical method using heat and pressure. In this case, in order for such a thermally bonded nonwoven fabric to effectively function as a filter support when combined with the dust-collecting member, it is necessary to implement the thermally bonded nonwoven fabric having a structure that exhibits good air permeability, excellent morphological stability, and favorable bending workability.

To this end, the inventors of the present invention examined the yarn supplied to the material supply unit 100 shown in FIG. 1. Specifically, a biodegradable thermal bonding composite fiber having a bi-component structure was examined as a thermally bondable yarn in order to implement a thermally bonded dry nonwoven fabric suitable for the biodegradable filter support through a thermal bonding process using calendaring in the thermal bonding unit 700.

First, the biodegradable thermal bonding composite fiber will be described hereinafter.

The biodegradable thermal bonding composite fiber serves to bond adjacent different thermally bonded fibers when applied with heat and pressure. The biodegradable thermal bonding composite fiber may be a well-known fiber that is called a low-melting-point yarn (or a low-melting-point fiber), an LM (low melting) yarn, or a non-melting-point yarn (or a non-melting-point fiber) in which a melting point is absent and a softening point is present. The biodegradable thermal bonding composite fiber may be employed as an appropriate material without limitation as long as it is a polyester-based biodegradable component having a thermal bonding property, which is employed in the well-known fiber for the above-mentioned use purpose. In addition, a sheath-core type composite fiber, in which a low-melting-point polyester resin as such a thermal bonding component is positioned at a sheath portion thereof and a high-melting-point polyester resin is positioned at a core portion thereof, shows a more beneficial result as a material for use in the filter support.

The biodegradable thermal bonding composite fiber may be either a fiber formed from only the above-mentioned biodegradable thermal bonding component or a fiber comprising the above-mentioned thermal bonding component exposedly formed on a surface thereof. Preferably, the biodegradable thermal bonding composite fiber may be a composite fiber having a sheath-core type cross section. In this case, in the sheath-core type composite fiber, the thermal bonding component may form the sheath portion, and a component having a melting point higher than that of the thermal bonding component, for example, high-melting-point polyethylene terephthalate may form the core portion. In addition, a sheath-core type composite fiber, in which a low-melting-point polyester resin as such a thermal bonding component is positioned at a sheath portion thereof and a high-melting-point polyester resin is positioned at a core portion thereof, shows a more beneficial result as a material for use in the filter support.

In a more preferable embodiment, the biodegradable thermal bonding composite fiber is a composite fiber formed from two kinds of biodegradable polyester resins having different melting points. The composite fiber comprises a biodegradable low-melting-point polyester and a biodegradable high-melting-point PET, preferably a biodegradable low-melting-point PET and a biodegradable high-melting-point PET. Herein, the terms "low-melting-point" and "high-melting-point" are used to indicate the relative differences in the melting points to distinguish the two types of biodegradable polyesters from each other.

The low-melting-point polyester may have a melting point of 100 to 180° C., preferably a melting point of 110 to 150° C. If the melting point is less than 100° C., the heat resistance of the composite fiber may be deteriorated. On the contrary, if the melting point exceeds 180° C., the energy costs spent on thermal bonding may increase.

In addition, the low-melting-point polyester may have a softening point of 100 to 150° C., preferably 110 to 130° C.

The low-melting-point polyester resin, which serves as the thermal bonding component forming the sheath portion of the thermal bonding composite fiber, is manufactured by modifying at least one of the polyhydric carboxylic acid and diol used in its polymerization to allow the melting point to be lowered or absent, and allow only the softening point to be present. For example, the low-melting-point polyester resin may comprise a biodegradable thermal bonding polyester resin which has a melting point of 100 to 180° C. or no melting point, and has a softening point of 100 to 150° C.

For example, the biodegradable thermal bonding polyester resin of the sheath portion comprises a low-melting-point polyester resin formed of an acidic component acting as an aromatic component of the polyhydric carboxylic acid and containing terephthalic acid or its ester-forming derivative; and a diol component comprising 2-methyl-1,3-propanediol, 2-methyl-1,3-pentanediol, and ethylene glycol. In addition, the diol component may comprise 20 to 50 mol % of 2-methyl-1,3-propanediol, 0.1 to 2 mol % of 2-methyl-1,3-pentanediol, and the balance of ethylene glycol up to 100 mol. If the content of 2-methyl-1,3-propanediol in the diol component is less than 20 mole %, the low melting point performance may be lowered to decrease the thermal bondability. Contrarily, if the content of 2-methyl-1,3-propanediol in the diol component exceeds 50 mole %, the cross-sectional formability and heat resistance may be deteriorated due to excessive low melting point performance. Further, if the content of 2-methyl-1,3-pentanediol in the diol component is less than 0.1 mole %, its amount used is too small, disadvantageously resulting in a rapid reduction in the melt viscosity. On the contrary, if the content of 2-methyl-1,3-pentanediol in the diol component exceeds 2 mole, the spinning workability may be deteriorated.

The biodegradable thermal bonding polyester resin and/or the biodegradable polyethylene terephthalate resin used in to form the sheath portion and the core portion may comprise 0.5 to 3.0 wt % of a biodegradant. The biodegradant may comprise at least one selected from among aliphatic ester, aromatic ester, and polylactide. If the content of the biodegradant in the biodegradable resin is less than 0.5 wt %, the biodegradability may be deteriorated, and if the content of the biodegradant exceeds 3.0 wt %, the cross-sectional formability may be deteriorated when spinning the polymer resin, leading to a deterioration in the spinning workability. In addition, if the biodegradant is excessively added to the biodegradable resin, the heat resistance and the thermal bonding performance may be deteriorated.

In addition, the core portion forming the sheath-core type composite fiber may be made of a high-melting-point biodegradable polyester resin. In this case, the high-melting-point biodegradable polyester resin of the core portion has a melting point lower than that of a typical high-melting-point PET by adding the biodegradant, but may have a melting point of 220° C. or more. In a preferred example, the high-melting-point biodegradable polyester resin may use a high-melting-point biodegradable polyethylene terephthalate (PET). If the melting point of the high-melting-point biodegradable polyester resin is more than 220° C., the core portion will serve to stably maintain the fiber morphology during thermal bonding to improve pore formability. In addition, it is necessary that the difference in the melting point or the softening point between the sheath portion and the core portion should be 80° C. or more. If the difference in the melting point or the softening point therebetween is less than 80° C., the pore formability may be deteriorated in the manufacture of the nonwoven fabric using thermal bonding, resulting in a decrease in air permeability.

In addition, the sheath portion and the core portion of the sheath-core type composite fiber may have a weight ratio of 6.0:4.0 to 4.5:5.5, preferably 5.5:4.5 to 4.8:5.2. In this case, if the weight proportion of the core portion is less than 4.0, a problem may occur in that the pore formability of the dry nonwoven fabric decreases, and if the weight proportion thereof exceeds 5.5, the amount of the low-melting-point polyester used to form the sheath portion in the composite fiber may be too small, leading to a lack of thermal bond-ability and thus a deterioration in morphological stability. In other words, the sheath-core type composite fiber offers the advantage of having the thickness and air permeability suitable for filter support and enhancing morphological stability.

Further, in the present invention, the biodegradable ther-mal bonding composite fiber does not use a side-by-side type thermal bonding composite fiber. The reason for this is that a side-by-side type thermal bonding composite fiber comprising a first component composed of a low-melting-point polyester resin and a second component composed of a high-melting-point PET may causes a spiral winding pattern due to the difference in viscosity between the first component and the second component during heat treat-ment, leading to a deterioration in the morphological stabil-ity, which makes it unsuitable for use in the filter support.

The thermally bonded biodegradable filter support com-prising a laminated structure in which the dry nonwoven fabric produced using the aforementioned biodegradable thermal bonding composite fiber is laminated in a single layer or multiple layers may have an air permeability of 200 to 500 ccs (cm³/cm²/sec), more preferably 250 to 500 ccs, even more preferably 300 to 400 ccs. In the composite filter media, the thermally bonded filter support used in conjunc-tion with the dust-collecting member requires air permeabil-ity as a significant factor. If the air permeability is too high, it may lead to a deterioration in the morphological stability of the filter support. Contrarily, if the air permeability is too low, it may result in increased pressure loss (differential pressure) when used as the filter support for the dust-collecting member, which contributes to an increase in the energy costs. Thus, when the thermally bonded filter support has an air permeability ranging from 200 to 500 ccs, it may be used as a filter support for the composite filter media, which is good in morphological stability and bending work-ability, and shows the energy cost savings.

Meanwhile, in order for the filter support to be designed to have the air permeability of the above-specified range, the biodegradable thermal bonding composite fiber forming the dry nonwoven fabric preferably has an average fiber fineness of 1.5 to 4.0 denier, preferably 1.5 to 2.0 denier. When the above-specified range of the fiber fineness is satisfied, it may be advantageous to achieve the desired levels of morpho-logical stability, thickness, pore size, porosity, air perme-ability and the like. If the average fiber fineness of the composite fiber is less than 1.5 denier, the air permeability is too low, which may lead to an increase in the pressure loss of the filter support and thus higher energy costs, or it may be difficult to achieve the desired physical properties intended by the present invention, such as causing respiratory difficulty in the case of masks. Furthermore, if the composite fiber is manufactured with a fiber fineness of less than 1.5 denier, it may lead to a decrease in the cross-sectional formability, resulting in a significant deterioration in spinning workability. Furthermore, if the average fiber fineness of the composite fiber exceeds 4.0 denier, the air permeability increases but the porosity of the nonwoven fabric may become too large, allowing electrospun nanofi-bers to pass through the pores or get trapped within the pores, making it difficult to achieve the desired physical properties intended by the present invention.

In addition, the thermal bonding composite fiber may have an average fiber length of 38 to 64 mm. It may be preferable to use the composite fiber having an average fiber length of 38 to 51 mm in order to achieve the object of the present invention.

Further, according to an embodiment of the present inven-tion, the thermally bonded biodegradable filter support or the dry nonwoven fabric) may have a basis weight of 20 to 80 g/m², preferably 30 to 70 g/m². If the basis weight of the filter support or dry nonwoven fabric is less than 20 g/m², it may lead to a decrease in the thickness of the filter support or dry nonwoven fabric and a significant decrease in the strength thereof, resulting in a deterioration in morphologi-cal stability and durability of the composite filter media. In addition, if the basis weight of the filter support exceeds 80 g/m², it may lead to an increase in the thickness of the filter support and thus a decrease in the air permeability, and may lead to increased pressure loss to increase the energy costs, or it may lead to causing respiratory difficulty in the case of masks. Besides, the effect of reducing the costs based on lightness of the filter support may be halved.

In addition, the thermally bonded biodegradable filter support according to an embodiment of the present invention may have a thickness of 0.05 to 0.40 mm, preferably 0.08 to 0.35 mm, more preferably 0.10 to 0.30 mm. If the thickness of the filter support is less than 0.05 mm, it may lead to a deterioration in the morphological stability of the filter support.

Furthermore, the dust capture efficiency may decrease due to the insufficiency of a space for capturing dust, potentially leading to the shortened lifespan of the filter. on the contrary, if the thickness of the filter support exceeds 0.40 mm, it may lead to a decrease in the air permeability, resulting in increased pressure loss. Thus, it is preferable to use the dry nonwoven fabric having the thickness of the above-specified range as the filter support.

Further, the thermally bonded biodegradable filter support according to an embodiment of the present invention may have a tensile strength of 3 kgf/5 cm or more in the machine direction (MD), preferably 4 kgf/5 cm or more, more preferably 5 kgf/5 or more. If the MD tensile strength of the filter support is less than 3 kgf/5 cm, it may lead to a deterioration in the morphological stability of the filter support and a decrease in the bending workability when being bent, which may have an adverse effect on filtration efficiency and pressure loss, or may result in a deterioration in the morphological stability of the mask. Thus it is desirable to use the dry nonwoven fabric having the MD tensile strength of the above-specified range as the thermally bonded biodegradable filter support.

In addition, the biodegradable filter support according to an embodiment of the present invention may have a tensile strength retention of 90% or more, determined by the following equation 1:

$$\text{Tensile strength retention (\%)} = 100\% - \{(A - B)/A\} \times 100\% \qquad \text{[Equation 1]}$$

wherein A is an initial tensile strength of the biodegradable filter support, measured in the machine direction (MD), and B is an MD tensile strength of the biodegradable filter support, measured after being left to stand for 180 days under the conditions of a temperature of 25 ($\pm$10)° C. and a relative humidity of 55 ($\pm$15) %

If the MD tensile strength retention of the filter support is less than 90%, it may lead to a decrease in the tensile strength after 6 months of use under the above-specified temperature and humidity conditions, resulting in a deterioration in morphological stability and bending workability of the filter support. Thus, it can be seen that the physical properties of the filter support are maintained under the typical use period conditions. Furthermore, it can be found that when the MD tensile strength retention of the filter support is less than 90%, it exhibits a tensile strength retention similar to that of a non-biodegradable filter support, and thus it is not difficult to perform the function of the filter support while maintaining biodegradability.

As described above, the composite filter media for an air filter according to the present invention comprises the electrospun nanofiber layer formed on one or both surfaces of the thermally bonded biodegradable filter support, and may be a filter media that efficiently captures fine dust particles by means of a physical filtration mechanism based on a pore structure of the thermally bonded biodegradable filter support and a pore structure formed by the nanofiber of the nanofiber layer. In addition, the nanofiber layer may serve as a dust-collecting member.

The nanofiber of the nanofiber layer may preferably have a diameter of 50 to 800 nm, more preferably 70 to 500 nm. If the diameter of the nanofiber is less than 50 nm, the electrospun nanofiber may pass through the pores of the filter support during the formation of the nanofiber layer, causing the nanofiber layer to be wound up and then the nanoweb to be potentially peeled off during the unwinding of the composite filter media for subsequent processing or mask production. On the contrary, if the diameter of the nanofiber exceeds 800 nm, it may lead to an increase in pressure loss and make it difficult to achieve the desired filtration efficiency.

The composite filter media for air filters according to the present invention may be manufactured by performing a process of manufacturing the biodegradable composite filter media comprising the steps of: producing a thermally bonded biodegradable filter support; and forming the electrospun nanofiber layer.

The step of forming the thermally bonded biodegradable filter support is the same as that described in the foregoing, and thus a detailed description thereof will be omitted to avoid redundancy.

A step (220) of producing the composite filter media comprising the electrospun nanofiber is a step in which a polymer spinning solution is electrospun onto the produced thermally bonded biodegradable filter support composed of a dry nonwoven fabric, which is used as a substrate.

The polymer spinning solution is a solution in which a polymer is dissolved in an organic solvent, and may be produced by various polymers and organic solvents. The polymer used in this case may be a thermoplastic polymer comprising at least one selected from among polyimide, nylon, polyamide, polybenzimidazole, polyetherimide, polyacrylonitrile, polyaniline, polyethylene oxide, polyethylene naphthalate (PEN), polystyrene, polyvinyl chloride (PVC), polyvinyl alcohol, polyvinylidene fluoride, polyvinyl butyral, poly-L-lactic acid, polycaprolactone, and propylene glycol alginate, which can be dissolved in the organic solvents. Preferably, the polymer may use polyvinylidene fluoride (hereinafter referred to as "PVDF"). Furthermore, in the case where the biodegradable polymers such as polyvinyl alcohol, poly-L-lactic acid, polycaprolactone, and propylene glycol alginate used, it may result in a further reduction in an environmental burden.

In addition, the organic solvent may preferably be at least one selected from among propylene carbonate, butylene carbonate, 1,4-butyrolactone, diethyl carbonate, dimethyl carbonate, 1,2-dimethoxyethane, 1,3-dimethyl-2-imidazolidinone, dimethyl sulfoxide, ethylene carbonate, ethylmethylcarbonate, N,N-dimethylformamide, N,N-dimethylacetamide, N-methyl-2-pyrrolidone, polyethylenesulfolane, tetraethylene glycol dimethyl More ether, acetone, alcohol, or mixtures thereof. More preferably, N,N-dimethylformamide (hereinafter referred to as "DMF") is used as the solvent.

Further, the spinning solution may be further added by selectively combing additives such as a thermosetting adhesive like an urethane adhesive, a reactive adhesive, a water repellent agent, a hydrophilic agent, a flame retardant, and the like.

In the manufacturing process of the biodegradable composite filter media for an air filter according to the present invention, the electrospun nanofiber layer may be produced by performing a step of dissolving PVDF in an organic solvent to obtain a spinning solution, and then supplying the spinning solution to a nozzle of a electrospinning device block; and a step of electrospinning the spinning solution through the block nozzle to laminate a PVDF nanofiber nonwoven fabric on a dry nonwoven fabric or a thermally bonded biodegradable filter support substrate to thereby form the nanofiber layer.

In addition, the nanofiber layer may be formed in an attachment amount of 0.3 to 1.0 g/m² on any one surface of the thermally bonded biodegradable filter support. The attachment amount of the nanofiber layer is determined depending on the use purpose of the composite filter media and the diameter of the nanofilter. According to numerous experiments, it can be seen that if the attachment amount of the nanofiber layer is too small (less than 0.3 g/m²), it may lead to a decrease in the filtration efficiency, and if the attachment amount thereof excessively exceeds 1.0 g/m², it may lead to an increase in differential pressure (pressure loss), making it difficult to achieve a desired purpose as a filter.

In addition, the thus manufactured biodegradable composite filter media for air filters may be applied to air filters for various hygiene products, electrical appliances, electronic products, etc., and may preferably be incorporated into an air filter for facial masks.

EXAMPLES

Hereinafter, the present invention will be described in further detail with reference to examples. It will be obvious to a person having ordinary skill in the art that these examples are for illustrative purpose only and are not to be construed to limit the scope of the present invention.

Example 1: Production of Thermally Bonded Biodegradable Filter Support (i.e., Dry Nonwoven Fabric)

A staple fiber having an average fiber fineness of 2.0 denier and an average fiber length of 51 mm was prepared as a sheath-core type biodegradable thermal bonding composite fiber comprising a sheath portion and a core portion, which have a weight ratio of 5:5.

The sheath portion is composed of a biodegradable thermal bonding polyester resin (with a melting point of 110° C.) serving as a low-melting-point polyester resin. The biodegradable thermal bonding polyester resin comprises a polymerization resin composed of terephthalic acid as an acidic component and a diol component. In addition, the diol component comprises 40 mol % of 2-methyl-1,3-propanediol, 1.0 mol % of 2-methyl-1,3-pentanediol, and the balance of ethylene glycol up to 100 mol %.

Further, the biodegradable thermal bonding polyester resin comprises 1.5 wt % of polylactic acid as a biodegradant.

The core portion is composed of a biodegradable PET resin (with a melting point of 230 to 260° C.), and the biodegradable PET resin forming the core portion comprises 1.5 wt % of polylactic acid as a biodegradant.

Next, the dry nonwoven fabric was produced using the sheath-core type biodegradable thermal bonding composite fiber while passing through the material supply unit, the material blending unit, the hooper unit, the carding unit, the lapping unit, the drafting unit, the thermal bonding unit, and the winding unit in this order in a nonwoven fabric manufacturing process shown in FIG. 1. In this case, the dry nonwoven fabric was thermally bonded with a temperature of 160° C. and a pressure of 3 kg/cm$^2$ by calendaring in the thermal bonding unit so that a dry nonwoven fabric (with a basis weight of 30 g/m$^2$) having the physical properties shown in Table 1 below was manufactured as the thermally bonded biodegradable filter support.

More specifically, a sheath-core type biodegradable thermal bonding composite fiber as a yarn is supplied from the material supply unit 100 to the material blending unit 200, which in turn blends each yarn gathered together therein with each other. Then, the yarn blended and clumped together in the material blending unit 200 is separated in the hooper unit 300. The yarn separated in the hooper unit 300 is formed in the form of a thin film having a uniform thickness in the carding unit 400. Thereafter, a single-layered nonwoven fabric is supplied from the carding unit 400 to the lapping unit 500, which in turn laminates the single-layered nonwoven fabric into multiple layers while laterally moving the single nonwoven fabric layer to thereby form a nonwoven fabric layer with a specific thickness. Then, the nonwoven fabric layer is supplied from the lapping unit 500 to the drafting unit 600 and is stretched. Then, the stretched nonwoven fabric layer is fed from the drafting unit 600 to the thermal bonding unit 700, and then is bonded by heat and pressure in the thermal-bonding unit 700. Subsequently, the nonwoven fabric layer bonded in the thermal bonding unit 700 is fed to and wound up in the winding unit 800 to thereby manufacture a dry nonwoven fabric.

Comparative Example 1

A dry nonwoven fabric was manufactured in the same manner as described in Example 1. A typical non-biodegradable polyester-based thermal bonding composite fiber comprising a sheath portion and a core portion, which have a weight ratio of 5:5, and having a fiber fineness of 2.0 denier and a fiber length of 51 mm was used as a yarn to thereby manufacture a dry nonwoven fabric as a thermally bonded filter support.

Examples 2 to 5 and Comparative Examples 2 to 4

A dry nonwoven fabric was manufactured in the same manner as described in Example 1, except that the fiber fineness of the thermal bonding composite fiber, and the base weight, the thickness, the air permeability, the tensile strength and the like of the biodegradable filter support were changed as shown in Table. 1 below to thereby a thermally bonded biodegradable filter support having the physical properties as shown in Table 1 below.

Experimental Example 1

An evaluation was made on the thermally bonded biodegradable filter support manufactured in Examples 1 to 5 and Comparative Examples 1 to 4 in terms of the following physical properties, and the results of the evaluation were shown in Table 1 below.

(1) Basis Weight

The basis weight of the thus manufactured filter support was measured using a standard weight scale. The filter support manufactured was cut into a size of 50×50 cm at a total of three different points including the center thereof and the left and right intermediate positions based on the center, and the weight of the filter support was measured at the three points to obtain an average weight value. The average weight value was then converted to the unit of g/m$^2$ to express the basis weight (g/m$^2$).

(2) Thickness

The thickness of the thus manufactured filter support was measured using a dial thickness gauge (MODEL H, PEACOCK Co., JAPAN). The thickness of a nonwoven fabric was measured at a total of three different points including the center thereof and the left and right intermediate positions based on the center to obtain an average thickness value.

(3) Air Permeability

The air permeability of the thus manufactured filter support was measured using an air permeability tester (MODEL FX-3300, TEXTEST Co.). The air permeability of a nonwoven fabric was measured at a total of three different points including the center thereof and the left and right intermediate positions based on the center to obtain an average air permeability value. The measurement of the air permeability were made at a pressure of 125 Pa, and the results of the measurement were expressed in units of ccs (cm$^3$/cm$^2$/sec).

(4) Tensile Strength

The tensile strength of the thus manufactured filter support was measured in the machine direction (MD) in accordance with KS K ISO 9073-3. The distance between the clamps of a tensile strength testing machine was set to be 200 mm, and both ends of a specimen in the machine direction (MD) were gripped between the clamps. The specimen was straightened and gripped so that the load was positioned at the zero point of the graph, and the load-extension curve for each specimen was recorded by extending it at a constant extension rate of 100 mm/min, followed by measurement of the maximum shear strength in the unit of kg/5 cm. In addition, an MD tensile strength of the filter support was measured after being left to stand for six months (180 days) under the conditions of temperature and humidity of (25±10)° C. and (55±15) % RH, and then the changes in the tensile strength over time were observed.

(5) Tensile Strength Retention

The tensile strength retention was measured and calculated by the following equation 1:

$$\text{Tensile strength retention (\%)} = 100\% - \{(A - B)/A\} \times 100\% \quad \text{[Equation 1]}$$

wherein A is an initial tensile strength of the biodegradable filter support, measured in the machine direction (MD), and B is an MD tensile strength of the biodegradable filter support, measured after being left to stand for 180 days under the conditions of a temperature of 25 (±10)° C. and a relative humidity of 55 (±15) %.

(6) Comprehensive Evaluation

The physical properties of a biodegradable filter support and a general filter support, which were manufactured in Examples 1 to 5 and Comparative Examples 1 to 4, were measured and evaluated. As a result of the evaluation of the physical properties, when the filter supports satisfy all of the following conditions, it was determined to be acceptable (○), and all cases other than the following conditions were determined to be unacceptable (×): a thickness of 0.05 to 0.4 mm, a basis weight of 20 to 80 g/m², an air permeability of 200 to 500 ccs, a tensile strength 3 kgf/5 cm or more, a tensile strength retention of 90% or more.

Comparative Example 3, it could be found that the air permeability of the filter support decreased due to excessive thermal bonding and decreased thickness, resulting in an increase in pressure loss (differential pressure) of the filter support. Consequently, the results of the observation suggest that the filter support manufactured in Comparative Example 3 is not suitable for the composite filter media of the present invention.

In addition, in the case of Comparative Example 4, it could be found that the filter support had a bulky structure, leading to an increase in porosity and air permeability, a decrease in morphological stability, and a reduction in tensile strength. Consequently, it suggests that the filter support manufactured in Comparative Example 4 is not suitable for the composite filter media of the present invention.

Further, it could be found that the biodegradable filter support manufactured using the biodegradable thermal bonding composite fiber having a fiber fineness of 2 denier in Example 1 showed the physical properties similar to those of a general filter support manufactured using a typical polyester-based thermal bonding composite fiber having a fiber fineness of 2 denier in Comparative Example 1.

In addition, it could be found that the biodegradable filter support manufactured in Example 1 showed a value similar to the general filter support manufactured in Comparative Example 1 in terms of the tensile strength used as a substitute property for morphological stability, and that the

TABLE 1

| | | | | | Thermally bonded biodegradable filter support | | | |
| Classification | Thermal bonding composite fiber Fiber fineness(de)/ fiber length(mm) | Basis weight (g/cm²) | thickness (mm) | Air permeability (ccs) | initial MD tensile strength (A, kgf/5 cm) | MD tensile strength (B, kgf/5 cm) after 180 days | tensile strength retention (%) | Comprehensive evaluation |
|---|---|---|---|---|---|---|---|---|
| Example 1 | 2.0/51 | 30 | 0.12 | 340 | 6.4 | 6.3 | 98.4 | ○ |
| Example 2 | 1.5/51 | 31 | 0.11 | 280 | 6.5 | 6.3 | 96.9 | ○ |
| Example 3 | 4.0/51 | 31 | 0.13 | 440 | 6.1 | 6.0 | 98.4 | ○ |
| Example 4 | 2.0/51 | 22 | 0.08 | 480 | 3.9 | 3.8 | 97.4 | ○ |
| Example 5 | 2.0/51 | 78 | 0.26 | 210 | 18.8 | 18.4 | 97.9 | ○ |
| Comparative Example 1 | 2.0/51 | 31 | 0.12 | 350 | 6.2 | 6.1 | 98.4 | ○ |
| Comparative Example 2 | 6.0/51 | 31 | 0.14 | 520 | 5.3 | 5.1 | 96.2 | x |
| Comparative Example 3 | 2.0/51 | 32 | 0.04 | 170 | 9.6 | 9.3 | 96.9 | x |
| Comparative Example 4 | 2.0/51 | 31 | 0.39 | 590 | 2.8 | 2.6 | 92.9 | x |

As a result of the examination of Table 1 above, in the case of Comparative Example 2 in which the fiber fineness of the biodegradable thermal bonding composite fiber is 6.0, the air permeability of the filter support increased due to increased diameter of the fiber, resulting in deterioration in the morphological stability. Furthermore, when electrospinning was performed on the thus manufactured filter support as a substrate, a nanofiber with a size of 70 to 500 nm blocked the pores of the filter support, leading to an increase in pressure loss (differential pressure). In addition, the electrospun nanofiber passed through the pores of the nonwoven fabric of the filter support to allow the electrospun nanofiber to be protruded from the other opposite surface, resulting in to a deterioration in workability, such as the peeling off of the nanofiber occurring during the unwinding of the composite fiber media for subsequent processing after the winding up of the nanofiber layer. Further, in the case of biodegradable filter support manufactured in Example 1 showed a favorable result in terms of the morphological stability in case of a tensile strength of 3 kgf/5 cm or more so that the biodegradable filter support can be manufactured as a substitute for the conventional thermal bonding composite fiber. Furthermore, in the case of the biodegradable filter support, it is speculated that the thermal bondability may increase, resulting in a higher tensile strength. Also, an MD tensile strength retention of the biodegradable filter support, measured after a lapse of 180 days was 90% or more. Consequently, it could be found that the biodegradable filter support manufactured in Example 1 showed a value similar to the general filter support manufactured in Comparative Example 1 in terms of the tensile strength retention so that a biodegradable filter support having excellent physical properties could be manufactured.

Experimental Example 2: Evaluation of Composite
Biodegradability

An evaluation was made on the dry nonwoven fabrics (or
biodegradable filter supports) manufactured in Example 1,
Example 3 and Comparative Example 1 in terms of com-
posite biodegradability, and the results of the evaluation
were shown in Table 2 below.

(1) Evaluation of Composite Biodegradability

The composite biodegradability of the biodegradable fil-
ter support and the general filter support was measured in
accordance with ISO 21701. ISO 21701 evaluated the bio-
degradability of the filter supports by pre-treating the speci-
mens for 384 hours under the conditions of 90° C. tempera-
ture and 95% relative humidity, and then measuring the
amount of $CO_2$ generated from biodegradation after a lapse
of 180 days under the conditions of ISO 14855-1, an
international standard for testing biodegradability of plastics
in order to simulate the point at which fiber products are
disposed of after use.

TABLE 2

| Filter support | Composite biodegradability (%) |
|---|---|
| Example 1 | 63.2 |
| Example 3 | 64.5 |
| Comparative Example 1 | 5.1 |

It could be found from the above Table 2 that as the results
of the evaluation of the composite biodegradability of the
filter supports manufactured in Examples 1 and 3 and
Comparative Example 1, the biodegradability of the biode-
gradable filter supports manufactured using the biodegrad-
able thermal bonding composite fiber in Examples 1 and 3
was higher than that of the general filter support manufac-
tured in Comparative Example 1.

In addition, it could be seen from Table 1 and Table 2 that
it is possible to manufacture an environmentally-friendly
biodegradable filter support that maintains the physical
properties under the use conditions of the filter support and
biodegrades under soil burial conditions when disposed of
after use.

Manufacture Example 1: Manufacture of
Composite Filter Media for Air Filters

A PVDF spinning solution obtained by dissolving PVDF
in DMF acting as an organic solvent and stirring the mixture
was prepared. Thereafter, the PVDF spinning solution was
electrospun onto one surface of the thermally bonded bio-
degradable filter support manufactured in Example 1 to form
a nanofiber layer formed with a nanoweb by a nanofiber to
thereby manufacture a biodegradable composite filter media
for air filters or masks. In this case, the average diameter of
each nanofiber of the nanofiber layer was approximately 230
nm, and the attachment amount of the nanofiber layer
formed on the thermally bonded biodegradable filter support
was 0.52 $g/m^2$.

Manufacture Example 2: Manufacture of
Composite Filter Media for Air Filters

The biodegradable composite filter media was manufac-
tured in the same manner as described in Manufacture
Example 1 such that the PVDF spinning solution was
electrospun onto one surface of the thermally bonded bio-
degradable filter support to form a nanofiber layer formed
with a nanoweb by a nanofiber, except that the biodegrad-
able composite filter media for air filters was manufactured
using the thermally bonded biodegradable filter support
prepared in Example 3 instead of Example 1. In this case, the
average diameter of each nanofiber of the nanofiber layer
was approximately 230 nm, and the attachment amount of
the nanofiber layer formed on the thermally bonded biode-
gradable filter support was 0.48 $g/m^2$.

Comparative Manufacture Example 1: Manufacture
of Composite Filter Media for Air Filters A non-biodegradable composite filter media for air filters
or a composite filter media for masks was manufactured
using the general filter support as in Comparative Example
1. In this case, the average diameter of each nanofiber of the
nanofiber layer was approximately 230 nm, and the attach-
ment amount of the nanofiber layer formed on the thermally
bonded biodegradable filter support was 0.52 $g/m^2$.

Experimental Example 3: Measurement of
Filtration Efficiency and Differential Pressure of
Composite Filter Media for Air Filters An evaluation was made on the composite filter media for
air filters described in Manufacture Example 1 (Example 1),
Manufacture Example 2 (Example 3), and Comparative
Manufacture in terms of filtration efficiency (%) and differ-
ential pressure ($mmH_2O$), and the results of the evaluation
were shown in Table 3 below.

(1) Measurement Method of Filtration Efficiency and Dif-
ferential Pressure

The filtration efficiency and the differential pressure of the
thus manufactured composite filter media for air filters were
measured using a filter tester (MODEL TSI-8130A, TSI
Co.). The filtration efficiency (%) and the differential pres-
sure ($mmH_2O$) of a composite filter media having a width of
1,500 mm were measured a total of three different points
including the center thereof and the left and right interme-
diate positions based on the center, and the average mea-
surement values of the filtration efficiency (%) and the
differential pressure ($mmH_2O$) were obtained. In this case,
the measurement of the filtration efficiency (%) and the
differential pressure ($mmH_2O$) of the composite filter media
were conducted under the conditions of two airflow rates, 95
LPM (L/min) and 32 LPM, using 0.4 μm-sized paraffin oil
particles.

In addition, the physical properties of the thus manufac-
tured composite filter media for air filters were shown in
Table below.

TABLE 3

| Classification | Filter Support | Evaluation of Composite Filter Media | | | |
| | | 95 LPM | | 32 LPM | |
| | | Filtration efficiency (%) | Differential pressure (mmH$_2$O) | Filtration efficiency (%) | Differential pressure (mmH$_2$O) |
| --- | --- | --- | --- | --- | --- |
| Manufacture Example 1 | Example 1 | 92.8 | 21.5 | 92.2 | 6.1 |
| Manufacture Example 2 | Example 3 | 90.9 | 19.6 | 89.4 | 4.8 |
| Comparative Manufacture Example 1 | Comparative Example 1 | 92.6 | 21.7 | 91.8 | 6.2 |

It could be found that the filtration efficiency and the differential pressure of the composite filter media for air filters, manufactured using the filter support of Example 1, Example 3, and Comparative Example 1, were evaluated, and as a result, the measurement values of the filtration efficiency and the differential pressure of the biodegradable composite filter media for air filters as manufactured in Manufacture Example 1 and Manufacture Example 2 were favorable and similar to those of the composite filter media for air filters of Comparative Manufacture Example 1, manufactured using the conventional non-biodegradable filter support of Comparative Example 1. Consequently, it could be seen that the inventive biodegradable filter support can be a substitute for the conventional filter support.

In addition, referring to Table 3 showing the filtration efficiency and the differential pressure of the thus manufactured composite filter media for air filters or masks, it could be found that the filtration efficiency of the inventive biodegradable composite filter media, in which the thermally bonded biodegradable filter support and the electrospun nanofiber layer are combined together, was 90% or more under the measurement conditions of an airflow rate of 95 LPM, and the differential pressure thereof was 7 mmH$_2$O or less which is favorable under the measurement conditions of an airflow rate of 32 LPM. Consequently, it could be seen that the biodegradable composite filter media can be used as a biodegradable composite filter media for air filters and masks.

In particular, the composite filter media in Manufacture Example 2 demonstrated filtration efficiency and differential pressure levels equivalent to KF 80 according to the Korea Filter (KF) standard established by the Ministry of Food and Drug Safety in Korea. This indicates that it is possible to produce a composite filter media for masks at the KF 80 or KF 94 levels by adjusting the manufacturing conditions of the biodegradable filter support and the electrospun nanofiber, such as fiber diameter and nanofiber attachment amount.

As such, the biodegradable composite filter media for air filters in which the dry nonwoven fabric or the thermally bonded biodegradable filter support and the electrospun nanofiber are combined together has advantageous effects in that the weight proportion of the electrospun nanofiber to the composite filter media is significantly low, and thus the composite filter media biodegrades under soil burial conditions when disposed of after use, leading to a reduction in the environmental burden.

Although the embodiments of the present invention have been described above with reference to the accompanying drawings, the present invention is not limited to the above embodiments but may be modified in various forms. It will be understood by those skilled in the art to which the present invention pertains that the present invention may be embodied in other specific forms without departing from the technical spirit or essential characteristics thereof. The presently disclosed embodiments are therefore to be considered in all respects as illustrative and not restrictive.

What is claimed is:

1. A biodegradable composite filter media for an air filter of a facial mask, comprising:

a thermally bonded biodegradable filter support comprising a dry nonwoven fabric composed of single or multiple layers and made of sheath-core type polyester-based biodegradable thermal bonding composite fibers, each having a fiber length of 38 to 64 mm and a fiber fineness of 1.5 to 4.0 denier; and an electrospun nanofiber layer comprising a nanofiber having a diameter of 70 to 500 nm, the nanofiber layer being formed by electrospinning a polymer resin onto one or both surfaces of the thermally bonded biodegradable filter support, wherein the nanofiber layer is formed in an attachment amount of 0.3 to 1.0 g/m$^2$ on any one surface of the thermally bonded biodegradable filter support, wherein the dry nonwoven fabric is formed by thermally bonding the polyester-based biodegradable composite fibers to each other, and has a basis weight of 20 to 80 g/m$^2$ and a thickness of 0.05 to 0.40 mm, wherein each of the sheath-core type polyester-based biodegradable thermal bonding composite fiber comprises: a core portion comprising a biodegradable polyester resin having a melting point of 220 to 260° C.; and a sheath portion comprising a biodegradable thermal bonding polyester resin having a melting point of 100 to 180° C., which is lower than the melting or softening point of the core portion, wherein the difference in the melting point between the sheath portion and the core portion is 80° C. or more, and the sheath portion and the core portion have a weight ratio of 6.0:4.0 to 4.5:5.5, wherein the biodegradable polyester resin of the core portion is a biodegradable polyethylene terephthalate resin containing 0.5 to 3.0 wt % of a biodegradant, wherein the biodegradable thermal bonding polyester resin of the sheath portion comprises a low-melting-point polyester resin formed of an acidic component containing terephthalic acid; and a diol component, wherein the diol component comprises 20 to 50 mol % of 2-methyl-1,3-propanediol, 0.1 to 2 mol % of 2-methyl-1,3-pentanediol, and the balance of ethylene glycol up to 100 mol %, wherein the low-melting-point polyester resin comprises 0.5 to 3.0 wt % of a biodegradant, and wherein the thermally bonded biodegradable filter support has an air permeability of 200 to 500 ccs, a tensile strength of 3 kgf/5 cm or more, and a tensile strength retention of 90% or more, determined by the following equation 1:

[Equation 1]

$$\text{Tensile strength retention (\%)} = 100\% - \{(A - B)/A\} \times 100\%$$

wherein A is an initial tensile strength of the biodegradable filter support, measured in the machine direction (MD), and B is an MD tensile strength of the biodegradable filter support, measured after being left to stand for 180 days under the conditions of a temperature of 25 (±10)° C. and a relative humidity of 55 (±15) %.

2. The biodegradable composite filter media for an air filter according to claim 1, wherein the nanofiber comprises a thermoplastic polymer comprising at least one selected from among polyimide, nylon, polyamide, polybenzimidazole, polyetherimide, polyacrylonitrile, polyaniline, polyethylene oxide, polyethylene naphthalate (PEN), polystyrene, polyvinyl chloride (PVC), polyvinyl alcohol, polyvinylidene fluoride, polyvinyl butyral, poly-L-lactic acid, polycaprolactone, and propylene glycol alginate.

3. A method of manufacturing a biodegradable composite filter media for an air filter of a facial mask according to claim 2, the method comprising:

a first step of producing a dry nonwoven fabric made of sheath-core type polyester-based biodegradable thermal bonding composite fibers, each having a fiber length of 38 to 64 mm and a fiber fineness of 1.5 to 4.0 denier; and a second step of forming an electrospun nanofiber layer comprising a nanofiber having a diameter of 70 to 500 nm by electrospinning an electrospinning solution onto one or both surfaces of the dry nonwoven fabric, wherein the nanofiber layer is formed in an attachment amount of 0.3 to 1.0 g/m² on any one surface of the dry nonwoven fabric, wherein the dry nonwoven fabric is formed by thermally bonding the polyester-based biodegradable composite fibers to each other, and has a basis weight of 20 to 80 g/m² and a thickness of 0.05 to 0.40 mm, wherein each of the sheath-core type polyester-based biodegradable thermal bonding composite fiber comprises: a core portion comprising a biodegradable polyester resin having a melting point of 220 to 260° C.; and a sheath portion comprising a biodegradable thermal bonding polyester resin having a melting point of 100 to 180° C., which is lower than the melting or softening point of the core portion, wherein the difference in the melting point between the sheath portion and the core portion is 80° C. or more, and the sheath portion and the core portion have a weight ratio of 6.0:4.0 to 4.5:5.5, wherein the biodegradable polyester resin of the core portion is a biodegradable polyethylene terephthalate resin containing 0.5 to 3.0 wt % of a biodegradant, wherein the biodegradable thermal bonding polyester resin of the sheath portion comprises a low-melting-point polyester resin formed of an acidic component containing terephthalic acid; and a diol component, wherein the diol component comprises 20 to 50 mol % of 2-methyl-1,3-propanediol, 0.1 to 2 mol % of 2-methyl-1,3-pentanediol, and the balance of ethylene glycol up to 100 mol %, wherein the low-melting-point polyester resin comprises 0.5 to 3.0 wt % of a biodegradant, and wherein the thermally bonded biodegradable filter support has an air permeability of 200 to 500 ccs, a tensile strength of 3 kgf/5 cm or more, and a tensile strength retention of 90% or more, determined by the following equation 1:

[Equation 1]

$$\text{Tensile strength retention (\%)} = 100\% - \{(A - B)/A\} \times 100\%$$

wherein A is a tensile strength of the biodegradable filter support, measured in the machine direction (MD) at an early stage, and B is an MD tensile strength of the biodegradable filter support, measured after being left to stand for 180 days under the conditions of a temperature of 25 (±10)° C. and a relative humidity of 55 (±15) %.

4. A facial mask comprising an air filter into which the biodegradable composite filter media according to claim 1 is incorporated.

5. A facial mask comprising an air filter into which the biodegradable composite filter media according to claim 2 is incorporated.

* * * * *